United States Patent [19]

Kondo

[11] 3,940,776

[45] Feb. 24, 1976

[54] MOTOR-DRIVE CONTROLLING APPARATUS

[75] Inventor: Isao Kondo, Hachioji, Japan

[73] Assignee: Olympus Optical Co., Ltd., Tokyo, Japan

[22] Filed: May 13, 1974

[21] Appl. No.: 469,678

[30] Foreign Application Priority Data

May 18, 1973 Japan.............................. 48-55223
May 30, 1973 Japan.............................. 48-60710
Oct. 4, 1973 Japan.............................. 48-111688

[52] U.S. Cl. ................. 354/173; 354/204; 354/206
[51] Int. Cl.² ......................................... G03B 1/18
[58] Field of Search ........... 354/170, 171, 173, 204, 354/205, 206

[56] References Cited
UNITED STATES PATENTS

| | | | |
|---|---|---|---|
| 3,640,201 | 2/1972 | Kimura | 354/173 |
| 3,688,669 | 9/1972 | Ogiso et al. | 354/171 |
| 3,813,681 | 5/1974 | Sahara | 354/173 |

*Primary Examiner*—L. T. Hix
*Assistant Examiner*—Russell E. Adams, Jr.
*Attorney, Agent, or Firm*—Flynn & Frishauf

[57] ABSTRACT

A motor-drive controlling apparatus used in attachment with a still camera includes a motor circuit having a motor for driving the shutter releasing mechanism and the film winding mechanism of the still camera, a motor-driven switch, and a shutter switch actuated interlockingly with the shutter releasing mechanism. At least one operating switch controls the operation of a timer circuit in association with that of the shutter switch. The timer switch varies its output condition when it is successively operated longer than a length of time from the end of operation of the shutter switch to the start of the next operation thereof. A control circuit operates in response to the output condition of the timer circuit for controlling the energization of the motor in association with the motor-driven switch and the shutter switch.

12 Claims, 10 Drawing Figures

(TIME CHART OF CONTINUOUS PHOTOGRAPHING)

MOTOR-DRIVE CONTROLLING APPARATUS

This invention relates to a motor-drive controlling apparatus including circuit means for stopping a motor when the shutter mechanism of a camera has not been operated any longer than a predetermined time.

Generally, a motor-drive controlling apparatus is so constructed as to control the energization of a motor for driving the shutter releasing mechanism and film winding mechanism thereby to effect frame photographing and continuous photographing. Particularly in the case of the continuous photographing, the operating switch is kept in an operated condition and the motor is thereby rotated continuously thereby to effect continuous photographing. In the prior art apparatus, however, the motor continues its rotation while the operating switch is operated. For this reason, even where the film winding operation has been disabled from being carried out due to the termination of a charged film or to the occurrence of a film-catch trouble, the motor undesirably continues its rotation.

The object of the invention is to provide a motor-drive controlling apparatus which is adapted to stop the driven motor where the film winding has been disabled due to the termination of a charged film or to the occurrence of a film-catch trouble.

SUMMARY OF THE INVENTION

According to the present invention, a motor-drive controlling apparatus used in attachment with a still camera includes a motor circuit having a motor for driving the shutter releasing mechanism and the film winding mechanism included in the still camera, a motor-driven switch, and a shutter switch actuated interlockingly with the shutter releasing mechanism. At least one operating switch for operating the apparatus is connected to a timer circuit to operate the timer circuit in association with the shutter switch. The timer circuit varies its output condition at a predetermined time after the termination of a charged film or the occurrence of a film-catch problem or the like. In response to the output condition of the timer circuit a control circuit operates to control the energization of the motor in association with the motor-driven switch and the shutter switch.

BRIEF DESCRIPTION OF THE DRAWINGS

This invention can be more fully understood from the following detailed description when taken in conjunction with the accompanying drawings, in which.

DETAILED DESCRIPTION OF ILLUSTRATED EMBODIMENTS

Figure 1:
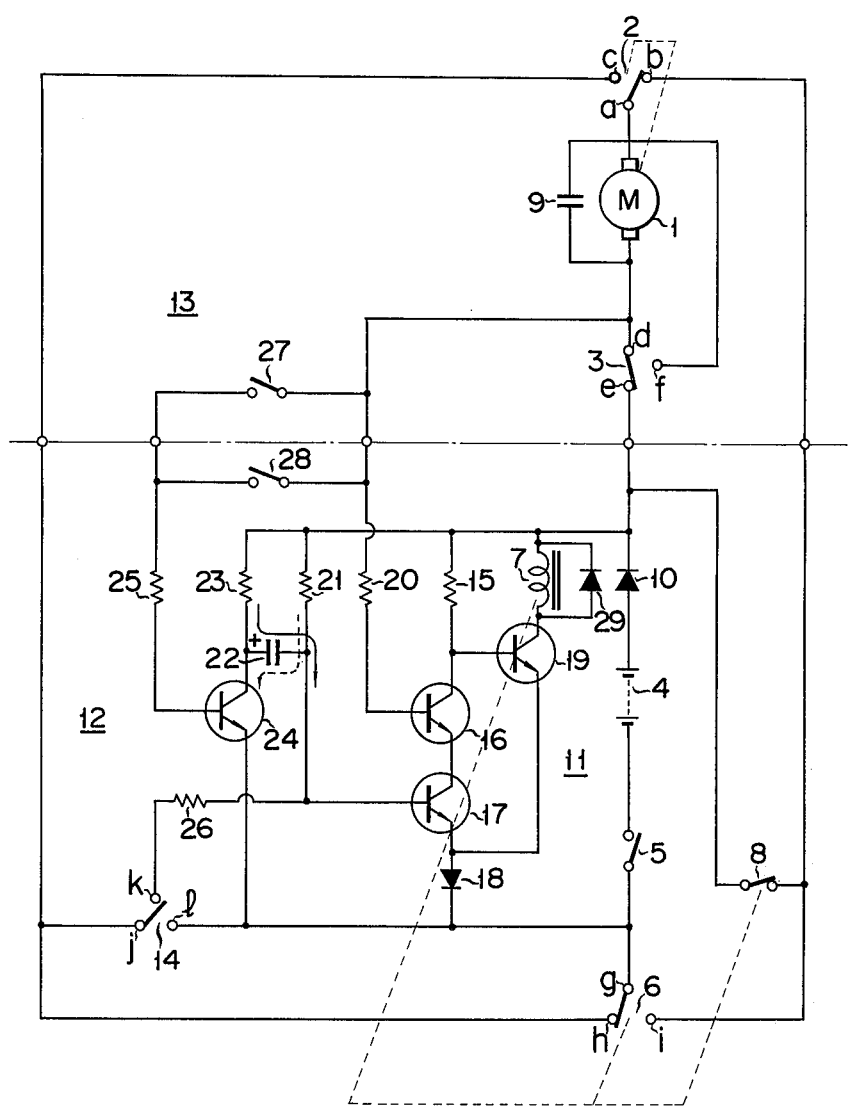
FIG. 1 is a circuit diagram showing a motor-drive controlling device according to an embodiment of the invention.

In an embodiment illustrated in FIG. 1, a DC motor is provided for the purpose of mechanically driving the shutter releasing mechanism and film winding mechanism of a camera. A change-over switch 2 is operated interlockingly with the motor 1, and when the motor completes the driving of the film winding mechanism, a movable contact $a$ is brought into contact with a stationary contact $b$ whereas when the operation of the shutter releasing mechanism is completed, the movable contact $a$ is changed over to a stationary contact $c$.

A shutter switch 3 is operated in response to the opening or closing operation of the shutter, or to the rising or falling operation of the mirror of the camera. That is to say, when the mirror is situated in a fallen position, a movable contact $d$ contacts a stationary contact $e$ whereas when the mirror is situated in a risen position, the movable contact $d$ contacts a stationary contact $f$.

A DC source 4 is connected to a change-over switch 6 or a relay 7 via a source switch 5. Another switch 8 of the relay 7 is so provided as to short-circuit the motor and functions as a motor braking switch. A condenser 9 is connected in parallel to both ends of the motor 1, one end of which is connected to the movable contact $a$ of the change-over switch 2 and the other end of which is connected to the movable contact $d$ of the shutter switch 3. The stationary contact $e$ of the switch 3 is connected to the positive terminal of the DC source 4 via a diode 10. The negative terminal of the source 4 is connected to the movable contact $g$ of said relay switch 6 via the source switch 5. A stationary contact $i$ of said relay switch 6 is connected to the stationary contact $b$ of the change-over switch 2. A circuit closed by said stationary contacts $i$ and $b$ constitutes a motor circuit for driving the shutter releasing mechanism. The connection of the stationary contact $h$ of the relay switch 6 with the stationary contact $c$ of the change-over switch 2 causes the formation of another motor circuit for driving the film winding mechanism.

A control circuit 11 for controlling the energization of the relay 7 is connected to the relay. In the associated relationship with said control circuit is provided a timer circuit 12 for controlling the timing with which the relay 7 is operated. The collector of a transistor 24 of the timer circuit is connected to a diode 10 via a serial circuit of a capacitor 22 and resistor 21 and simultaneously connected to the diode 10 via a resistor 23. The movable contact $d$ of the shutter switch 3 is directly connected to the base of a transistor 16 of the control circuit 11 and simultaneously connected to the base of the transistor 24 of the timer circuit 12 via parallel-connected operating switches 27 and 28 and a resistor 25. The switch 27 is provided in a drive unit and the switch 28 in a control unit.

The movable contact $j$ of a manually operable mode change-over switch 14 is connected to the stationary contact $h$ of the change-over switch 6 of the relay and simultaneously connected to the stationary contact $c$ of the motor switch 2. One stationary contact $k$ is connected to the collector of the transistor 24 of the timer circuit via a resistor 26 and the capacitor 22 while the other stationary contact $l$ is connected to the movable contact $g$ of the change-over switch 6 of the relay. The mode change-over switch 14 is so arranged that when a frame photographing mode has selectively been determined, the movable contact $j$ is brought to the stationary contact $k$ whereas when a continuous photographing mode has selectively been determined, the movable contact $j$ is brought to the stationary contact $l$.

The resistor 15 of the control circuit 11 is connected at one end to the DC source 4 via the diode 10 and connected at the other end to the source switch 5 via a serial circuit of NPN transistors 16 and 17 and a diode 18. The collector of the transistor 16 is connected to the base of an NPN transistor 19, the emitter of which is connected to the emitter of the transistor 17 and the collector of which is connected to the positive terminal of the source 4 via a serial circuit of the relay 7 and diode 10. The base of the transistor 16 is connected to the movable contact $d$ of the shutter switch 3 via a resistor 20, and when said movable contact $d$ is in a state contacted with the stationary contact $e$, namely when the mirror of the camera is in a fallen position, the transistor 16 is rendered conducting. The base of the transistor 17 is connected to the connection point between the resistor 21 and capacitor 22 of the timer circuit 12. The transistor 17 is rendered conducting or nonconducting depending upon the magnitude of the potential at the connection point.

It is now assumed in the above-mentioned circuit construction that an operating switch 27 or 28 is opened and the operation of the film winding mechanism is completed. Then, the movable contact $a$ of the switch 2 is contacted with the stationary contact $b$, and the movable contact $g$ of the relay switch 6 is contacted with the stationary contact $h$, and the shutter releasing circuit and the film winding circuit are both opened, and the movable contact $d$ of the shutter switch 3 is contacted with the stationary contact $e$ and the relay switch 8 is closed. Under this condition, the motor 1 is short circuited and stopped by the electric brake.

When, under this condition, the source switch 5 is closed, the transistor 24 is rendered nonconducting, so that current is flowed from the source 4 via the diode 10, resistor 23, capacitor 22, transistor 17 base emitter path, diode 18 and source switch 5 to permit the capacitor 22 of the timer circuit 12 to be charged in a direction indicated by an arrow of solid line. Since, at this time the transistors 16 and 17 are both rendered conducting, the transistor 19 is rendered nonconducting to deenergize the relay 7.

Next, when the operating switch 27 or 28 is closed, the transistor 24 is rendered conducting, so that the charged voltage of the capacitor 22 is impressed as a reverse bias voltage between the base of the transistor 17 and the cathode of the diode 18 via a transistor 24, so that the transistor 17 is rendered nonconducting. For this reason, the transistor 19 is rendered conducting to energize the relay 7, so that the relay switch 8 is opened and the relay switch 6 is changed over to the contact $i$. Accordingly, the motor 1 is so rotated as to drive the shutter releasing mechanism. When the shutter releasing mechanism completes its operation, the motor switch 2 is changed over to the stationary contact $c$, so that the motor 1 ceases to be rotated.

The shutter switch 3 is changed over to the stationary contact $f$ in response to the operation of the mirror rising in accordance with the starting operation of the shutter releasing mechanism of the camera. The base circuit of the transistor 24 is thereby opened to render the same nonconducting. Since, at this time, the transistor 16 is rendered nonconducting though the transistor 17 is rendered conducting, the transistor 19 remains conducting and the relay 7 therefore continues to be energized. Further, when the mirror has risen, the motor 1 is short circuited by the shutter switch 3, so that the motor is rapidly stopped by the electric brake. Since, accordingly, the motor remains fully stopped during the period in which the camera shutter is opened, the camera is prevented from receiving the vibration of the motor rotation to permit the performance of a stable exposure operation.

When the shutter releasing mechanism of the camera completes its operation, the mirror is allowed to fall to cause the shutter switch 3 to be again changed over to the stationary contact $e$. Since, at this time, the transistor 24 is rendered conducting concurrently with the conduction of the transistor 16, the transistor 17 is rendered nonconducting. Accordingly, the transistor 19 remains conducting and the relay is therefore maintained energized.

There will now be described the case where a frame photographing and continuous photographing are effected with the apparatus kept in the above-mentioned condition. 1. Frame photographing Since, in this case, the mode change-over switch 14 is changed over so as to cause the movable contact $j$ to contact the stationary contact $k$, the capacitor 22 is charged through a charging path of the contact $c$ of the switch 2, the contact $k$ of the switch 14, a resistor 26, a capacitor 22 and the transistor 24 as well as through a charging path of the resistor 21, the capacitor 22 and the transistor 24. Accordingly, the capacitor 22 is charged in an extremely shorter time than charged through the resistor 21 alone. For this reason, the base potential of the transistor 17 is rapidly increased to render the transistor 17 conducting in a short time. As the result, the transistors 16 and 17 are both rendered conducting and the transistor 19 is therefore rendered nonconducting. Further, the relay is deenergized, so that the relay switch 6 has its movable contact $g$ changed over to the stationary contact $h$ and simultaneously the switch 8 is closed. Further, the motor 1 makes its rotation to operate the film winding mechanism. When the film winding mechanism completes its operation, the switch 2 has its movable contact $a$ changed over to the stationary contact $b$. As the result, the motor circuit is opened and simultaneously the motor is short circuited, so that the motor is rapidly stopped.

When the operating switch 27 or 28 is opened, the transistor 24 is rendered nonconducting, so that the capacitor 22 is charged in the direction indicated by an arrow of solid line via the resistor 23, so that the motor-drive controlling apparatus is returned to the initial condition. This means that the apparatus is in a condition ready for the next photographing operation. Accordingly, when the operating switch 27 or 28 is again closed, the shutter releasing mechanism is operated and in consequence the film winding mechanism commences its operation. In this manner, the frame photographing is performed.

When, in the course of the frame photographing, the film winding operation is disabled from being carried out due to the termination of a charged film or to the occurrence of a film-catch trouble, the shutter releasing mechanism of the camera is disabled from being energized, so that the switching-over operation of the switch 3 is disabled from being performed, so that the timer circuit 12 is not reset. Further, the capacitor 22 is successively charged via the resistor 21 for a longer time than required to effect the film winding and shutter releasing operations, and when this charged voltage has its level raised up to a level high enough to render the transistor 17 conducting, the transistor 19 is rendered nonconducting, so that the relay 7 is deenergized. At this time, when the motor switch 2 has its movable contact changed over to the stationary contact b, the motor is stopped. Where the film winding is disabled in this manner, the motor is fully stopped without being rotated idly. 2. Continuous photographing Since, in this case, the mode change-over switch 14 is so changed over as to bring the movable contact j into contact with the stationary contact l, the movable contact g and stationary contact h of the relay switch 6 are short circuited, so that the shutter switch 3 is changed over to the stationary contact e and simultaneously the film winding operation is carried out. When the film winding operation is completed, the switch 2 is changed over to the stationary contact b. At this time, the capacitor 22 is charged in a direction indicated by an arrow of dotted line via the resistor 21 alone. A longer time is required to charge said capacitor as compared with the case where the frame photographing is carried out, so that the transistor 17 is maintained nonconducting for a while and the relay is thereby maintained energized.

If the time constant of the resistor 21 and capacitor 22 are so determined as to cause the base potential of the transistor 17 to increase up to a level high enough to render said transistor 17 conducting in case the timer circuit 12 is successively operated for a longer time than exactly required to perform the film winding and shutter releasing operations, the switch 2 will be changed over to the stationary contact b and simultaneously the motor 1 will be so rotated as to drive the shutter releasing mechanism because when the film winding operation is completed, the relay still remains energized. The mirror is allowed to rise by the shutter releasing operation, so that the shutter switch 3 is changed over to the stationary contact f to render the transistor 24 nonconducting, so that the capacitor 22 is charged in a reverse direction, as indicated by an arrow of solid line. Under this condition, the transistor 17 is rendered conducting but the transistor 16 is rendered nonconducting, so that the relay is maintained energized. Since, as above described, the transistors 16 and 17 are alternately rendered conducting or nonconducting, it never happens that the transistor 19 is rendered nonconducting. Accordingly, as far as the operating switch 27 or 28 is closed, the relay 7 is maintained energized, so that the shutter releasing and film winding operations are alternately carried out by the changing-over operation of the switch 2, thereby effecting the continuous photographing.

When, in the course of the continuous photographing, the film winding operation is disabled from being carried out due to the termination of a charged film or to the occurrence of a film-catch trouble, the shutter releasing mechanism of the camera is disabled from being energized, so that the switching-over operation of the switch 3 is disabled from being performed, so that the timer circuit 12 is not reset. Further, the capacitor 22 is successively charged via the resistor 21 for a longer time than required to effect the film winding and shutter releasing operations, and when this charged voltage has its level raised up to a level high enough to render the transistor 17 conducting, the transistor 19 is rendered nonconducting, so that the relay 7 is deenergized. At this time, when the motor switch 2 has its movable contact changed over to the stationary contact b, the motor is stopped. Where, as above described, the film winding operation is disabled from being performed due to the termination of a charged film or to the occurrence of a film-catch trouble, the motor is automatically stopped independent from the operated condition of the operating switch 27 or 28.

When the switch 27 or 28 is opened, the transistor 24 is rendered nonconducting, so that the capacitor 22 is charged via the resistor 23 in a direction indicated by an arrow of solid line, so that the apparatus is returned to the initial condition. Further, when, in the course of the continuous photographing, the operating switch 27 or 28 is opened, the transistor 24 is rendered nonconducting and the transistor 17 is therefore rendered conducting, so that the relay 7 is deenergized to stop the motor 1. Further, the capacitor 22 is charged via the resistor 23 in a direction indicated by an arrow of solid line, so that the apparatus is returned to the initial condition.

Figure 2:
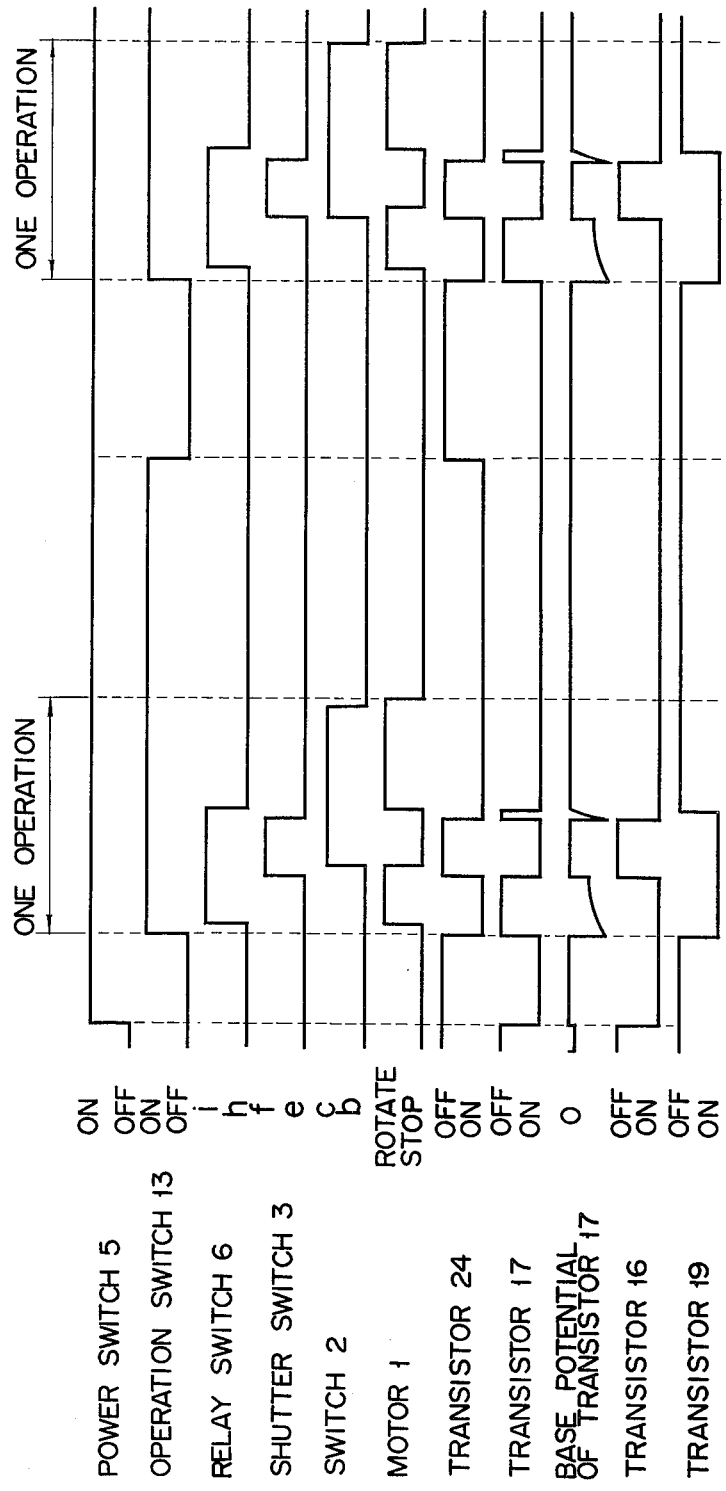
FIG. 2 shows time charts when one frame photographing is effected using the apparatus of FIG. 1.
Figure 3:
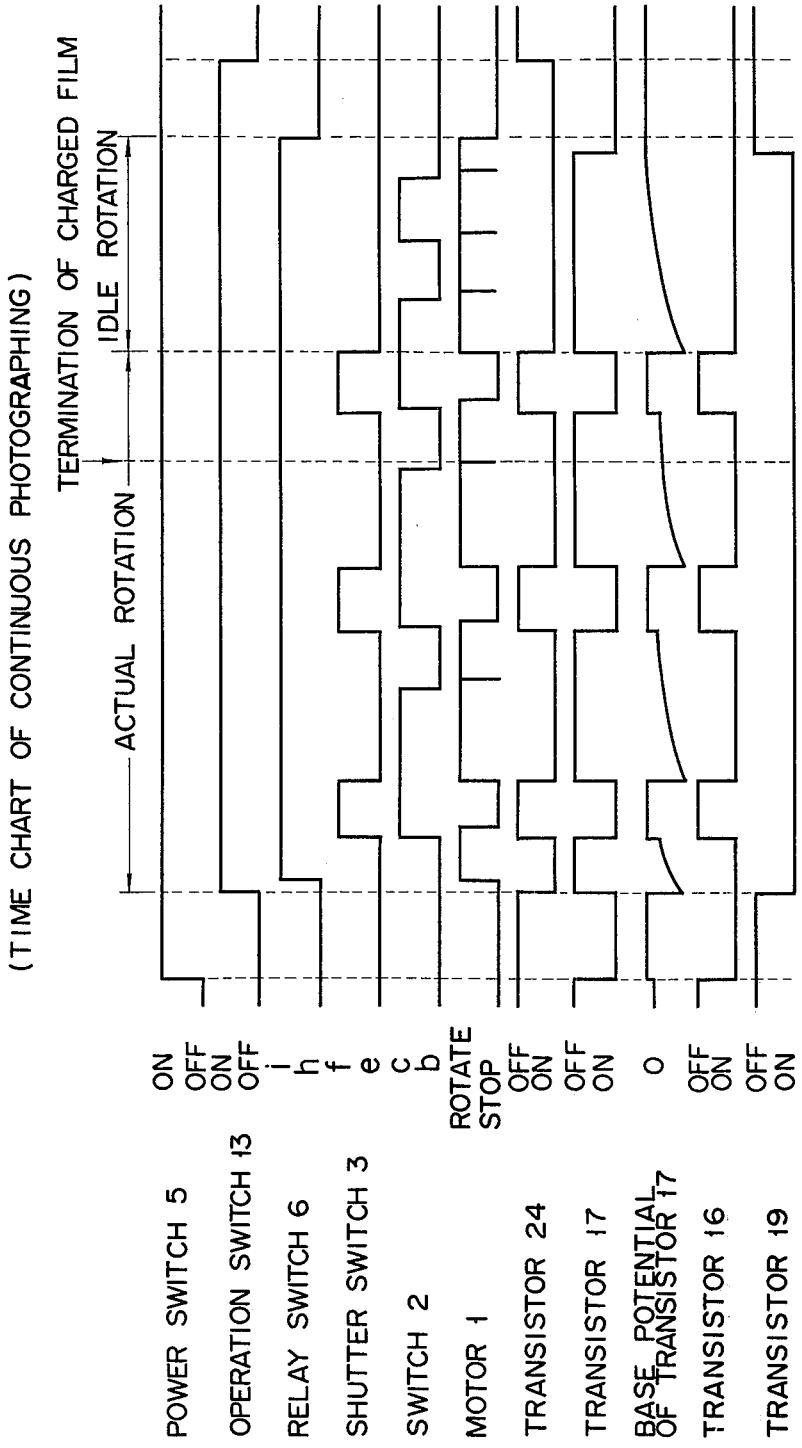
FIG. 3 shows time charts when continuous photographing is effected using the same apparatus.

FIGS. 2 and 3 respectively are time charts showing the operated conditions of the aforesaid frame photographing and continuous photographing.

Figure 4:
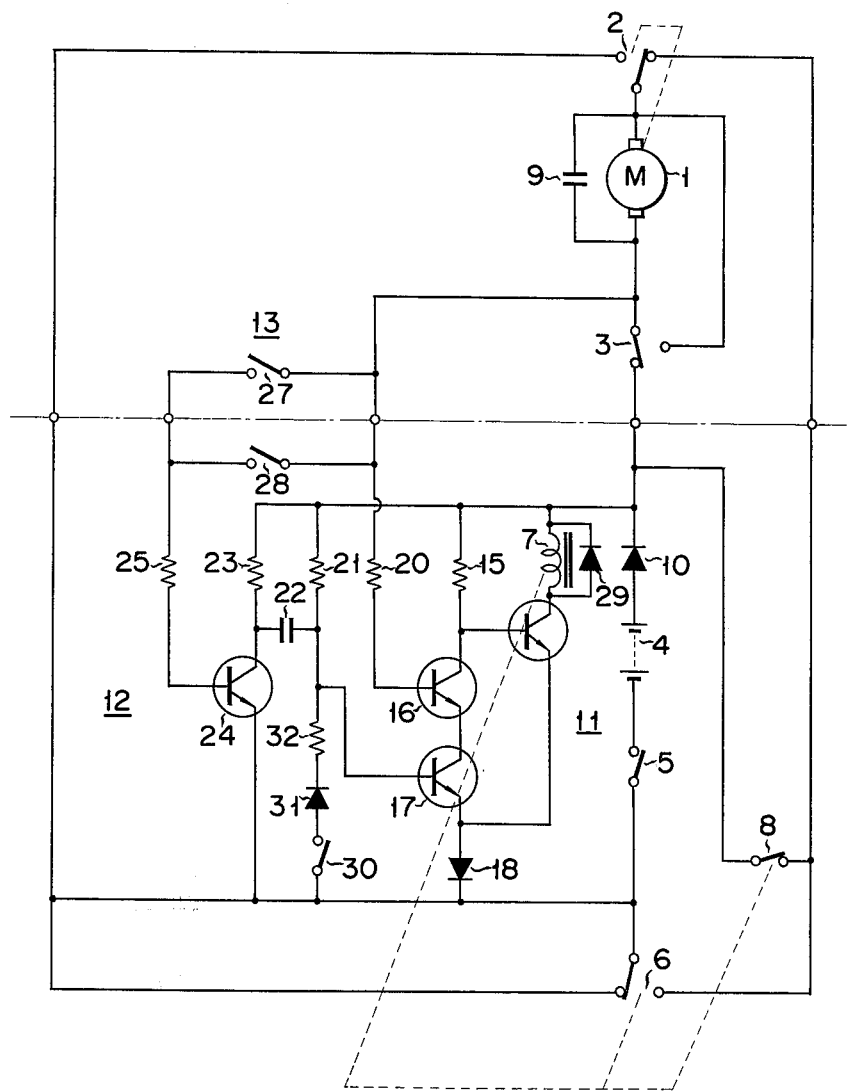
FIG. 4 is a circuit diagram showing a motor-drive controlling apparatus according to another embodiment of the invention, having a mode change-over switch circuit modified from that of the apparatus shown in FIG. 1.

The preceding embodiment is so constructed that, at the frame photographing time, the capacitor 22 of the timer circuit 12 is charged via the stationary contact c of the switch 2, the stationary contact k of the mode change-over switch 14 and the resistor 26. But the apparatus according to this embodiment may be so constructed, for example, as shown in FIG. 4, such that a serial circuit of a mode change-over switch 30, diode 31 and resistor 32 is connected to a connection point between the capacitor 22 and the resistor 21 and the movable contact g and the stationary contact h of the relay switch 6 are short circuited.

Figure 5:
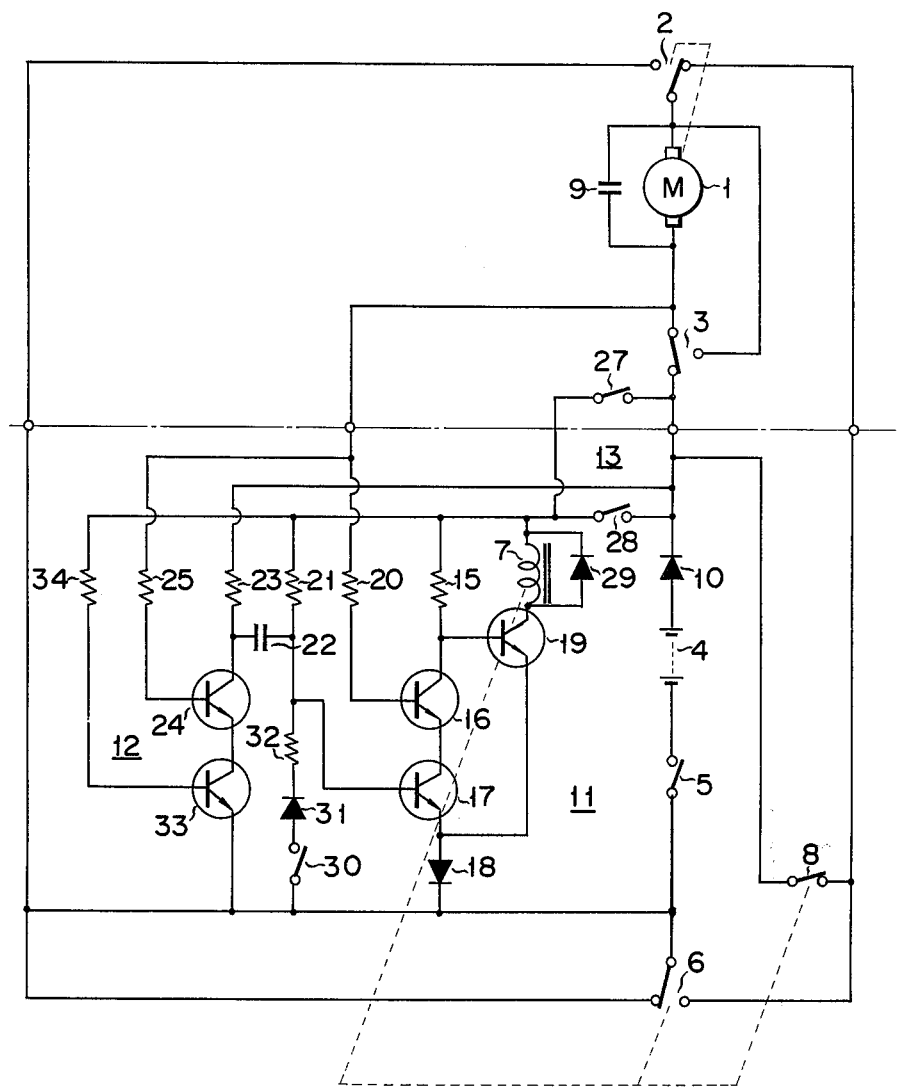
FIG. 5 is a circuit diagram showing a motor-drive controlling apparatus according to another embodiment of the invention, having a timer circuit modified from that of the apparatus shown in FIG. 1.

Further, the preceding embodiment is so constructed as to permit the operating switch 27 or 28 to control the timer circuit 12 alone. But the apparatus according to this embodiment may be constructed as shown in FIG. 5. Namely, the operating switches 27 and 28 are connected between a source circuit including a source 4 and a circuit consisting of the control circuit 11 and timer circuit 12. The timer circuit 12 includes an additional transistor 33 connected in series to the transistor 24. The base of the transistor 33 is connected to the operating switch 27 or 28 via a resistor 34. The base of the transistor 24 is connected to the connection point between the motor 1 and the switch 3 via the resistor 25. If arrangement is made as such, both the control circuit 11 and the timer circuit 12 will be able to be controlled by the operation of the operating switch 27 or 28.

Figure 6:
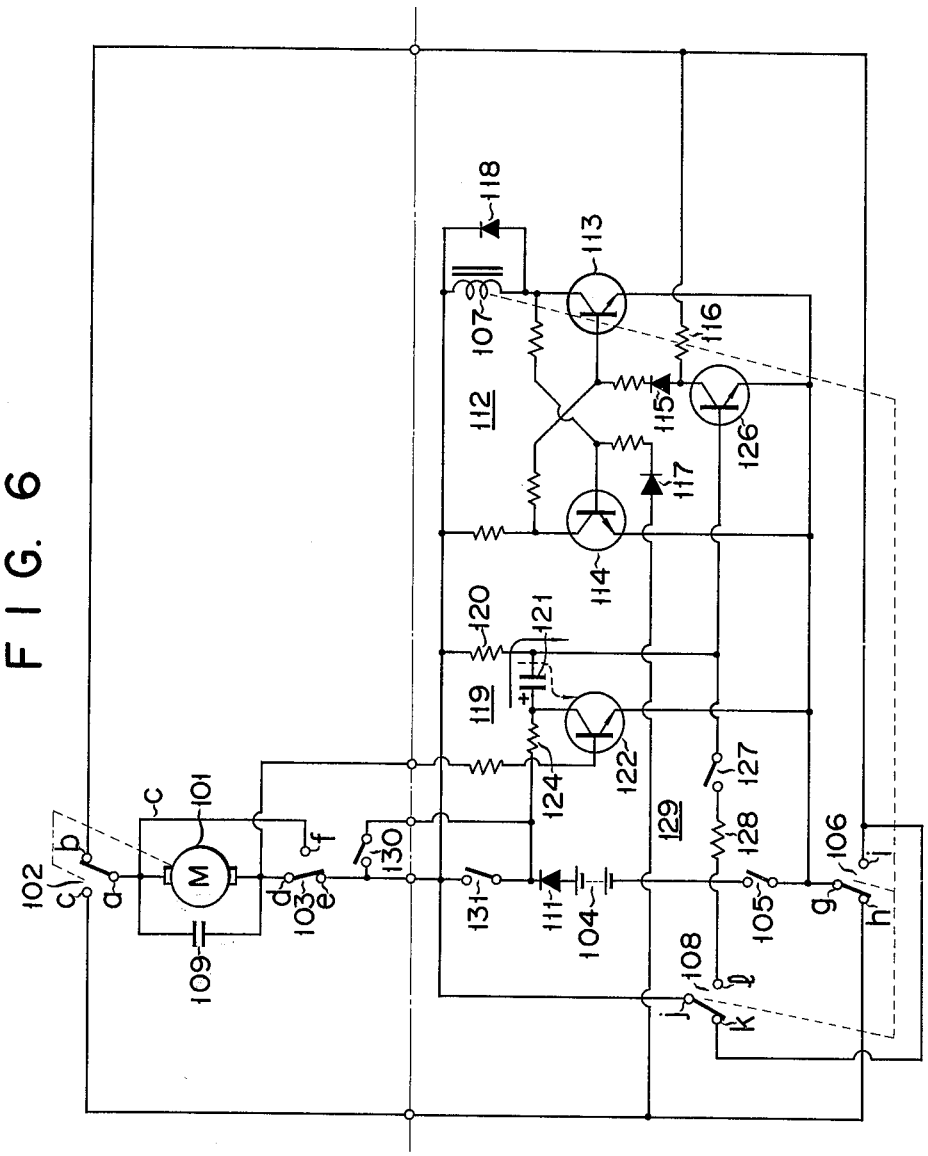
FIG. 6 is a circuit diagram showing a motor-drive controlling apparatus according to another embodiment of the invention, using a bistable circuit.
Figure 7:
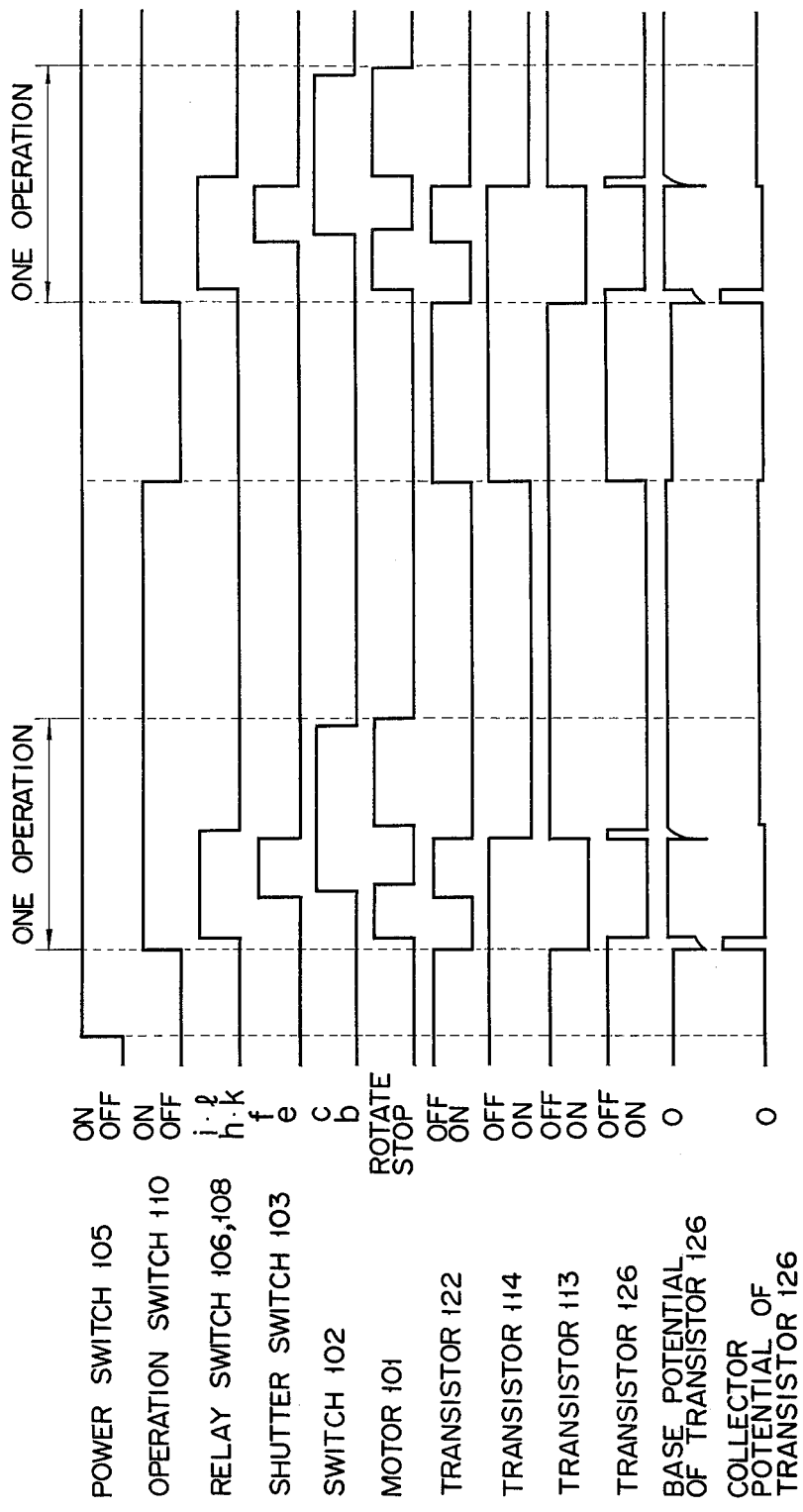
FIG. 7 shows time charts when frame photographing is effected using the apparatus of FIG. 6.
Figure 8:
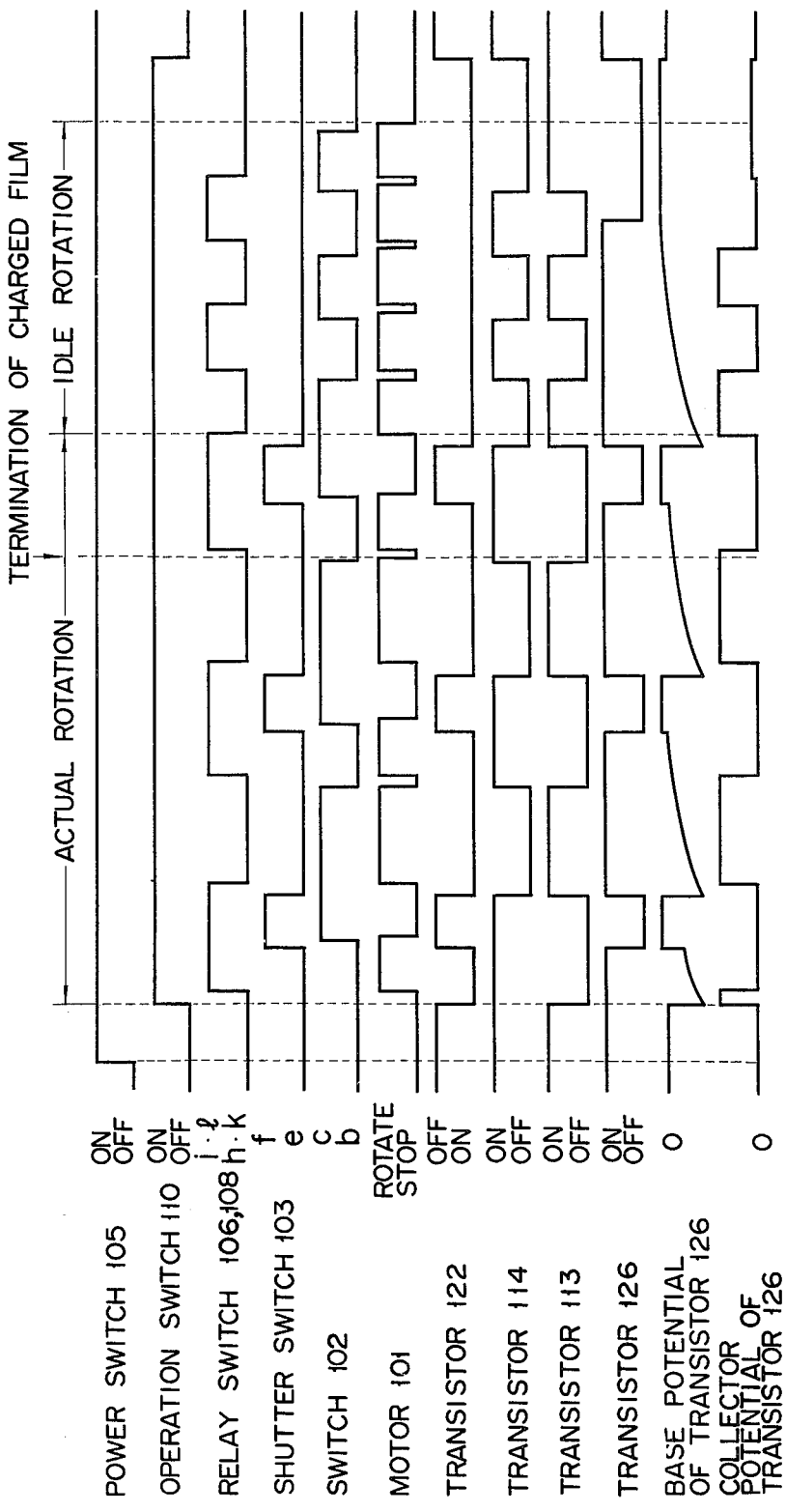
FIG. 8 shows time charts when continuous photographing is effected using the apparatus of FIG. 6.

In an embodiment illustrated in FIG. 6, one end of a motor 101 connected in parallel to a capacitor 109 is connected to the movable contact a of a change-over switch 102, and the other end of the motor 101 is connected to the movable contact d of a shutter switch 103. The stationary contact e of the switch 103 is connected to the positive terminal of a DC source 104 via a serial circuit of operating switches 130, 131 and a diode 111, and the stationary contact f is connected to one end of said motor 101. The negative terminal of the DC source 104 is connected to the movable contact g of a relay switch 106 via a source switch 105. The stationary contact i of said relay switch 106 is connected to the stationary contact b of the change-over switch 102. The stationary contact h of the relay switch 106 is connected to the stationary contact c of the change-over switch 102.

The movable contact j of a relay switch 108 is connected to the stationary contact c of the shutter switch 103, and the stationary contact k is connected to the stationary contact b of the change-over switch 102.

A bistable circuit 112 is connected to the DC source 104 via the operating switch 131, diode 111 and source switch 105. A relay 107 is connected to the collector circuit of the setting transistor 113 of the bistable circuit, and when this transistor 113 is rendered conducting, the relay 107 is energized. The base of the setting transistor 113 is connected to the stationary contact b of the change-over switch 102 via a diode 115 and a resistor 116, and the base of a resetting transistor 114 is connected to the stationary contact c via a diode 117. Connected in parallel to said relay 107 is a diode 118 for offsetting a reverse electromotive force.

A timer circuit 119 is constituted by a serial circuit of a resistor 120, capacitor 121 and NPN transistor 122, and is connected to the DC source 104 via the diode 111, operating switch 110 and DC switch 105. The connection point between the capacitor 121 and the collector of the transistor 122 is connected to the positive terminal of the source 104 via a resistor 124 and the diode 111. The connection point between a capacitor 121 and the resistor 120 is connected to the negative terminal of the source 104 via the base emitter path of an NPN transistor 126 and the source switch 105. The timer circuit 119 is so constructed that when it is operated for a longer time than required to perform the film winding operation and the shutter releasing operation, the transistor 126 is rendered conducting. The operating time of the timer circuit is determined by the time constant of the resistor 120 and capacitor 121. The base of the transistor 122 is connected to the movable contact d of the shutter switch 103, the collector of the transistor 126 is connected to the connection point between the diode 115, and the resistor 116 of the bistable circuit 112, and the base of the transistor 126 is connected to the stationary contact l of the relay switch 108 via a serial circuit of a mode-selection switch 127 and resistor 128. Said mode switch 127 is closed in the case of the frame photographing and opened in the case of the continuous photographing.

In the motor-drive controlling apparatus having the above-mentioned circuit construction, when the source switch 105 is closed, the capacitor 121 is charged in a direction indicated by an arrow of solid line. Next, the operating switch 130 or 131 is closed, the transistor 122 is rendered conducting, so that the capacitor 121 of the timer circuit 119 is charged in a direction indicated by an arrow of dotted line and opposite to the above-mentioned charging direction. At this time, the charging voltage of the capacitor 121 is impressed as a reverse bias voltage between the base and emitter of the transistor 126 via the collector emitter path of the transistor 122 to maintain the transistor 126 nonconducting. At this time, a positive voltage is impressed on the base of the transistor 113 of the bistable circuit 112 via the change-over switch 102 to render the transistor 113 conducting. As the result, the relay 107 is energized and the relay switches 106 and 108 are therefore changed over to the stationary contacts i and l, respectively. As the result, the motor 101 is rotated to drive the shutter releasing mechanism. When the shutter releasing mechanism of the camera is operated, the shutter switch 103 is changed over to the stationary contact f in response to the rising movement of the mirror thereby causing the motor 101 to be stopped. At this time, the change-over switch 102 is changed over to the stationary contact c. When the shutter releasing mechanism of the camera completes its operation to cause the mirror to fall, the shutter switch 103 is changed over to the stationary contact e to render the transistor 122 conducting, so that the capacitor 121 is reversely charged to render the transistor 126 nonconducting. As the result, the transistor 113 is rendered conducting to deenergize the relay 107, so that the relay switches 106 and 108 are changed over to the stationary contacts h and k, respectively. For this reason, the motor 101 is rotated to drive the film winding mechanism. When the film winding operation is completed, the change-over switch 102 is changed over to the stationary contact b, so that the motor is stopped.

There will now be described the case where the frame photographing and continuous photographing are effected. In the frame photographing, the switch 127 is in a closed state, so that the capacitor 121 is rapidly charged with a current passing through two charging paths, one being provided via the resistor 120 and the other being provided via the resistor 128 and switch 127. Accordingly, the transistor 126 is rapidly rendered conducting. Even if, therefore, the change-over switch 102 is changed over to the stationary contact b, the transistor 113 of the bistable circuit 112 is not rendered conducting, so that the relay 107 is not energized. For this reason, the motor 101 is not rotated, so that the apparatus is not operated. However, when the operating switch 130 or 131 is once opened and thereafter closed, the frame photographing can again be carried out. On the contrary, when the switch 127 is opened for performing the continuous photographing, the capacitor 121 is slowly charged only with a current passing through the resistor 120. Therefore, at the time when the switch 102 is changed over to the stationary contact b, the transistor 126 is maintained nonconducting. For this reason, the transistor 113 is rendered conducting to energize the relay 107, so that the relay switches 106 and 108 are operated to rotate the motor 101, so that the shutter releasing operation is carried out. As described above, as far as the operating switch 130 or 131 is closed, the continuous photographing is performed.

Where, in the frame photographing and continuous photographing, the film winding operation is disabled due to the termination of a charged film or to the occurrence of a film-catch trouble, the timer circuit is disabled from being reset due to the inoperability of the shutter switch 103, so that the transistor 126 is maintained conducting, so that the relay 107 is maintained deenergized, so that the motor 101 is stopped.

Figure 9:
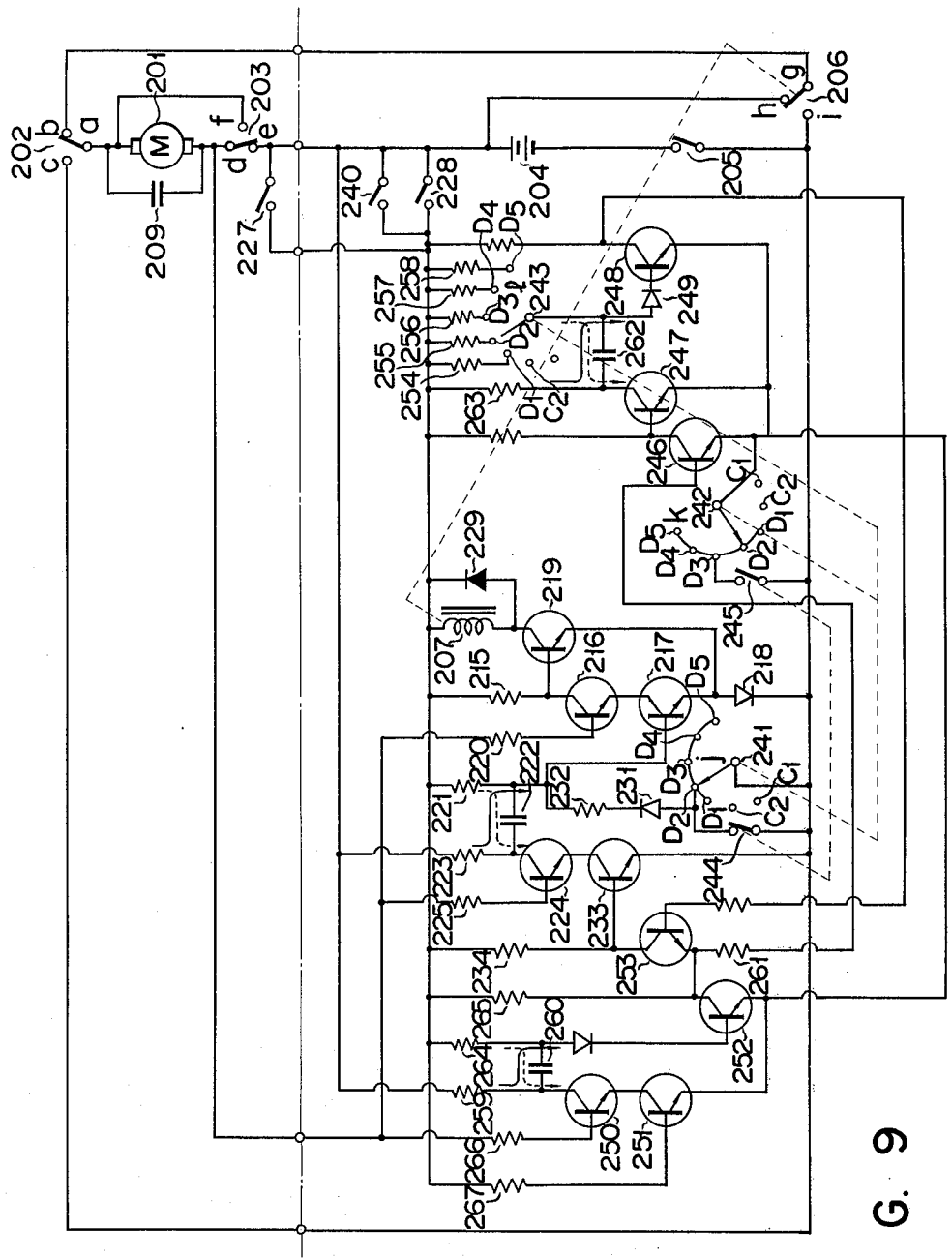
FIG. 9 is a circuit diagram showing a motor-drive contolling apparatus according to another embodiment of the invention, provided with a delay circuit.

A motor-drive controlling apparatus according to another embodiment of the invention shown in FIG. 9 is provided with a delay circuit, and is so constructed that photographing intervals can properly be determined.

Referring to FIG. 9, a delay-control switch 224 is connected in parallel to switches 227 and 228. Multicontact change-over switches 241, 242 and 243 respectively have movable contacts $j$, $k$ and $l$ allowed to contact in turn delay time setting terminals $D_1$, $D_2$, $D_3$, $D_4$ and $D_5$ and free terminals $C_1$ and $C_2$. Selection switches 244 and 245 are so designed as to select alternatively the frame photographing or the continuous photographing including delay operations, regardless of the set positions of the multicontact switches. Under the condition in which the switch 244 is closed and the switch 245 is opened, the frame photographing can be effected, and under the reverse condition the continuous photographing can be effected. If the delay time of a delay circuit is selectively determined, the continuous photographing can be carried out with a prescribed time delay. This operation can be repeatedly performed by electrically resetting the delay circuit with the operating switch maintained closed. The movable contact $l$ of the switch 243 is connected via a diode 249 to the base of a transistor 248 of the delay circuit including transistors 246, 247 and 248, and the emitter of the transistor 248 is connected to the respective emitters of the transistors 246 and 247.

A circuit including transistors 250, 251, 252 and 253 is a time detection circuit provided for the purpose of securing the operation of a relay 207 and stopping the motor when a charged film is completed. Where, in the above-mentioned circuit construction, the switch 244 is closed and the switch 245 is opened, namely where the frame photographing is effected, the emitters of the transistors 246, 247, 248, 250, 251, 252 and 253 are electrically separated from the negative line, so that a circuit having said transistors is in a nonoperated condition. Under this condition, the apparatus according to this embodiment of the invention performs the same operation as the frame photographing operation in the embodiment shown in FIG. 5, and therefore description of its operation is omitted.

There will now be described the operation of the circuit according to the embodiment in the case where the switch 244 is opened and the switch 245 is closed and the movable contact $l$ of the multicontact switches is brought into contact with, for example, the contact $D_2$.

When, under the above-mentioned condition, the source switch 205 is closed, capacitors 222 and 260 are charged in directions indicated by arrows of solid lines. In this case, it is preferred to set the time constant of the capacitor 222 and resistor 221 and the time constant of the capacitor 260 and resistor 259 so that this charging time may be approximately 10 ms.

Next, when an operating switch 240 is closed, the transistors 250 and 251 are rendered conducting by a positive voltage impressed upon the respective bases of the transistors 250 and 251 via resistors 266 and 267. At this time, the charged voltage of the capacitor is impressed on the base of the transistor 252 to render the same nonconducting. When the transistor 252 is rendered nonconducting, the transistor 246 of the delay circuit is rendered conducting, so that the transistor 247 is rendered nonconducting. For this reason, a capacitor 262 is charged in a direction indicated by an arrow of solid line via a resistor 263 to render the transistor 248 conducting, so that the transistor 253 is rendered nonconducting. When both or either of the transistors 252 and 253 is rendered nonconducting, a transistor 233 is rendered conducting. Since, however, a transistor 224 connected in series to the transistor 233 is in a condition rendered conducting, the charged voltage of the capacitor 222 is impressed on a transistor 217 to render the same nonconducting. As the result, a transistor 219 is rendered conducting to energize the relay 207, so that the movable contact $g$ of the relay switch 206 is changed over from the stationary contact $h$ to the stationary contact $i$. At this time, the motor 201 is rotated to drive the shutter releasing mechanism. When the shutter releasing operation is carried out, namely when the mirror is allowed to rise, the switch 203 is changed over to the stationary contact $f$, so that the capacitors 222 and 260 are charged in directions indicated by arrows of solid lines. For this reason, the transistors 247 and 252 are both rendered conducting to render both transistors 246 and 248 nonconducting, so that the transistor 253 is rendered conducting. Further, since, although the transistor 217 is rendered conducting, a transistor 216 is rendered nonconducting, a transistor 219 is maintained conducting. As above described, during the period in which the movable contact $d$ of the switch 203 is separated from the stationary contact $e$, the transistor 252 is rendered conducting to render the transistor 246 nonconducting, so that the transistor 247 is rendered conducting. Thus, the transistor 248 is rendered nonconducting to render the transistor 253 conducting, but the base potential of the transistor 248 is recovered in a time corresponding to the time constant defined by the capacitor 262 and resistor 254, so that where the shutter speed is low and the set delay time is short, the transistor 248 is often rendered conducting to render the transistor 253 nonconducting. Even in this case, the base circuit of the transistor 224 is opened, so that the relay 207 is maintained energized. When the shutter releasing operation is completed, so that the movable contact $d$ of the switch 203 is changed over to the stationary contact $e$ and the movable contact $a$ of a switch 202 is changed over to the stationary contact $c$, the motor 201 is rotated to drive the film winding mechanism. At the time when the movable contact $d$ of the switch 203 is brought back to the stationary contact $e$, the transistor 250 is rendered conducting to charge the capacitor 260 in a direction indicated by an arrow of dotted line, so that the transistor 252 is rendered nonconducting. The nonconduction of the transistor 252 renders the transistor 246 again conducting, so that the transistor 247 is rendered nonconducting. The capacitor 262 is charged via the resistor 263, and the transistor 247 is maintained nonconducting until the capacitor 262 is fully charged. This charging time is determined by the time constant of a resistor 264 and the capacitor 260. When, after lapse of a prescribed length of time, the transistor 252 is rendered conducting to render the transistor 246 nonconducting, so that the transistor 247 is rendered conducting, the delay circuit is operated. Since the transistor 248 is rendered nonconducting during the delay operation, the transistor 253 is maintained conducting and as the result a transistor 233 is maintained nonconducting, and when the film winding mechanism has been reset, the transistor 217 is rendered conducting. Since, at this time, the transistor 216 is in a condition already rendered conducting, the transistor 219 is rendered nonconducting to deenergize the relay 207, so that the movable contact g of the relay switch 206 is changed over to the stationary contact h. Since, on the other hand, the movable contact g of the switch 206 is separated from the stationary contact j before the movable contact a of the motor switch 202 is changed over to the stationary contact b upon completion of the film winding operation, the apparatus remains ready for the next releasing operation. Upon lapse of a set length of delay time, the transistor 248 is rendered conducting to render the transistor 253 nonconducting, so that the transistor 233 is rendered conducting to cause the charged voltage of the capacitor 222 to be impressed on the base circuit of the transistor 233 so as to render the transistor 217 nonconducting. As the result, the transistor 219 is rendered conducting to energize the relay 207, so that the movable contact g of the relay switch 206 is changed over to the stationary contact j to rotate the motor, so that the shutter releasing operation is carried out simultaneously with the rotation of the motor. As above described, the continuous photographing is carried out in a delay time corresponding to the time constant of a resistor 255 and the capacitor 262. This delay time can desiredly be determined by changing-over the change-over switch 243 to the stationary contacts $D_1$ to $D_5$ respectively connected to resistors 254 to 258.

Where, during said continuous photographing, a charged film is terminated or a film-catch trouble takes place to disable the performance of the film winding operation, the motor 201 is stopped through the same operation as those described in the preceding embodiments.

Where the change-over switches 241, 242 and 243 are respectively changed over to the stationary contacts $C_1$ and $C_2$, the delay circuit is opened. If, under the change-over condition, the source voltage is properly varied to utilize the difference in the resultantly varied motor-drive torque, the continuous photographing can be varied in photographing interval.

Figure 10:
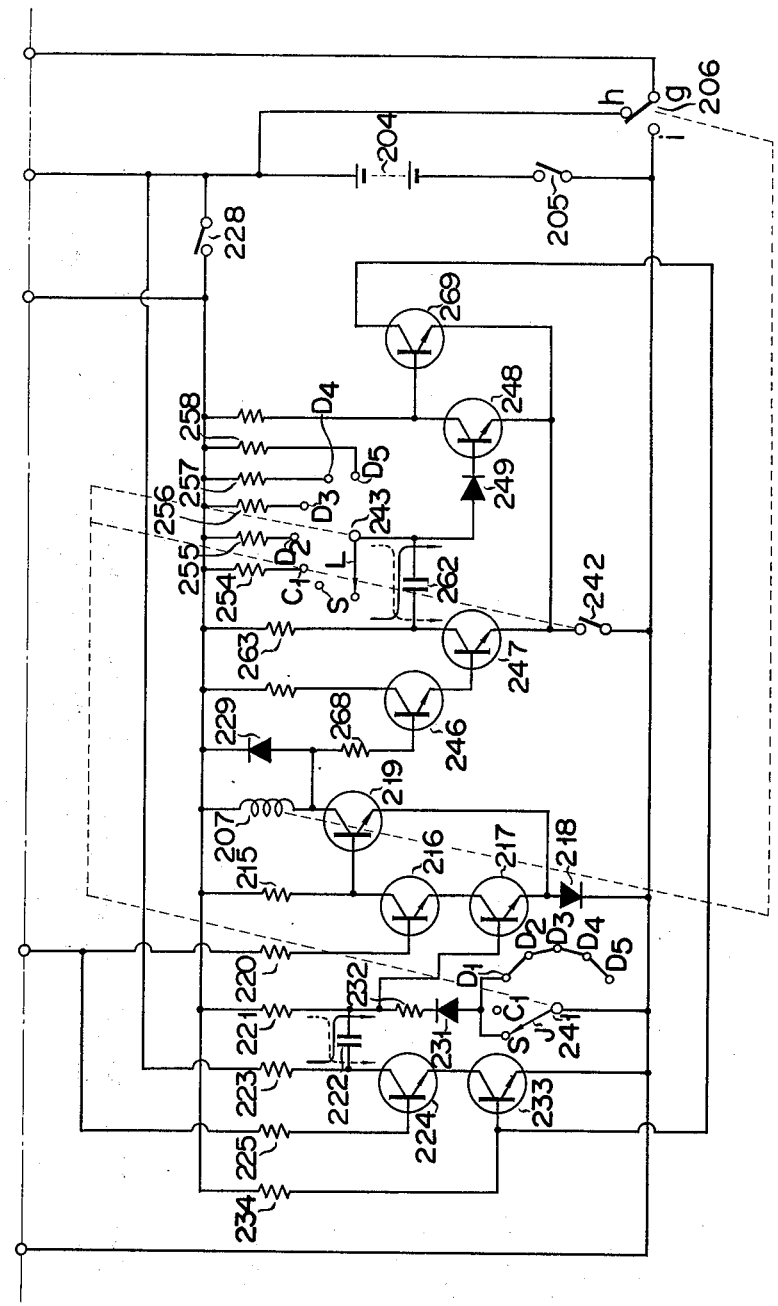
FIG. 10 is a circuit diagram showing a motor-drive controlling apparatus according to another embodiment of the invention, similarly provided with a delay circuit.

In another embodiment shown in FIG. 10, a circuit including the transistors 250 to 253 shown in FIG. 9 is omitted, and the base of the transistor 246 is connected to the collector of the transistor 219 via a resistor 268.

With the above-mentioned circuit construction, where the multicontact changing-over switch 243 is changed over to one of the stationary contacts $D_1$ to $D_5$, the switch 242 is closed. When the switch 243 is changed over to, for example, the stationary contact $D_2$, and the source switch 205 and operating switch 228 are closed, the transistor 246 is rendered conducting and then the transistor 247 is rendered conducting, so that the transistor 248 is rendered nonconducting to render the transistor 269 conducting, so that the transistor 233 is rendered nonconducting. However, where, in such operation process, the base potential of the transistor 248 is recovered in accordance with the time constant of the capacitor 262 and the resistor 255, and the shutter speed is low and the set time of delay is short, the transistor 269 is often rendered nonconducting to render the transistor 248 conducting, so that the transistor 233 is rendered conducting. Since, even in this case, the base circuit of the transistor 224 is in an opened condition, the relay 207 is maintained operated. upon completion of the shutter releasing operation, the motor is rotated to operate the film winding mechanism. When, after lapse of a prescribed length of delay time, the transistor 248 is rendered conducting, the transistor 269 is rendered nonconducting to render the transistor 233 conducting, so that the transistor 217 is rendered nonconducting to render the transistor 219 conducting. Accordingly, the relay 207 is energized to commence the shutter releasing operation again. As above described, the continuous photographing is carried out with a prescribed delay of time.

What is claimed is:

1. A motor-drive controlling apparatus used in attachment with a still camera having a shutter releasing mechanism and a film winding mechanism to permit alternatively a single frame photographing operation and a continuous photographing operation to be carried out with film charged therein, comprising:
   an operating switch for initiating operation of the motor-drive controlling apparatus:
   a motor circuit coupled to said operating switch and including a drive motor operatively coupled to and selectively driving said shutter releasing mechanism and said film winding mechanism;
   a shutter switch coupled to said shutter releasing mechanism and actuated interlockingly with the operation of said shutter releasing mechanism;
   a timer circuit coupled to said shutter switch and operating in response to the respective operations of said shutter switch and said operating switch, said timer circuit including means responsive to the termination of an advance of film for changing its output condition at a predetermined time after the termination of an advance of film caused by, for example, termination of a charged film, the occurrence of a film-catch problem, or the like; and
   a control circuit coupled to said shutter switch and to said timer circuit and operating in response to the operation of said shutter switch and said output condition of said timer circuit for controlling the energization of said motor.

2. A motor-drive controlling apparatus used in attachment with a still camera having a shutter releasing mechanism and film winding mechanism to permit alternatively a single frame photographing operation and a continuous photographing operation to be carried out with film charged therein, comprising:
   a motor circuit including a drive motor operatively coupled to and selectively driving said shutter releasing mechanism and said film winding mechanism;
   a shutter switch connected across said motor circuit and coupled to said shutter releasing mechanism so as to be actuated interlockingly with said shutter releasing mechanism;
   a motor-driven switch coupled to and actuated by said motor and connected across said motor circuit;
   at least one operating switch coupled to said motor circuit for starting the motor-drive controlling apparatus;
   a timer circuit operating in response to the operation of said at least one operating switch in association with the operation of said shutter switch, said timer circuit including means for changing its output condition when said timer circuit is successively operated longer than a length of time required from the end of operation of the shutter switch to the start of the next operation thereof;

a control circuit coupled to said shutter switch and to said timer circuit and operating in response to the output condition of said timer circuit in association with the operation of the shutter switch for controlling the energization of said motor in association with the respective operations of the motor-driven switch and the shutter switch; and means for selecting a single frame photographing operation or a continuous photographing operation, said selecting means being connected to said timer circuit to cause the output condition thereof to be changed at once after the end of operation of said shutter switch when said single frame photographing operation is selected.

3. A motor-drive controlling apparatus according to claim 2 wherein said timer circuit includes an RC circuit and said selecting means is connected to said RC circuit and includes means for substantially reducing the time constant of said RC circuit when said single frame photographing operation is selected.

4. A motor-drive controlling apparatus according to claim 2 wherein said timer circuit includes an RC circuit, and said selecting means includes means connected to the capacitor of said RC circuit to form an additional charging path for shortening the charging time of said capacitor when said single frame photographing operations is selected.

5. A motor-drive controlling apparatus according to claim 2 including a power source having a pair of terminals, and wherein:

said motor is connected in series to one terminal of said power source via said shutter switch;

said timer circuit connected to said selecting means comprises a capacitor, a first resistor, a second resistor, and a first transistor having a base connected to said one terminal of said power source via said shutter switch and said operating switch, a collector connected to said one terminal of said power source via said capacitor and said first resistor and also via said second resistor, and an emitter connected to the other terminal of said power source; and said control circuit comprises a second transistor having a base connected to said one terminal of said power source via said shutter switch, a collector connected to said one terminal of said power source and an emitter, a third transistor having a base connected to the connection of said capacitor and said first resistor, a collector connected to the emitter of the second transistor and an emitter connected to the other terminal of said power source, a fourth transistor having a base connected to the collector of the second transistor, an emitter connected to said other terminal of said power source, and a relay device connected between the collector of the fourth transistor and said one terminal of said power source and having a changeover relay switch connected across said motor circuit.

6. A motor-drive controlling apparatus according to claim 5 wherein said selecting means comprises a change-over switch having a movable contact connected to said motor circuit, a stationary contact connected to the capacitor of said timer circuit and another stationary contact connected to said other terminal of said power source.

7. A motor-drive controlling apparatus according to claim 5 wherein said selecting means comprises a switch and a diode connected in series with each other, said series circuit of said switch and said diode being connected between the capacitor of said timer circuit and said other terminal of said power source.

8. A motor-drive controlling apparatus according to claim 2 including a power source having a pair of terminals, and wherein:

said motor is connected in series to one terminal of said power source via said shutter switch;

said timer circuit comprises a capacitor, a first resistor, a second resistor, a first transistor having a base connected to said one terminal of said power source via said shutter switch and a collector connected to said one terminal of said power source via said first resistor and also via said capacitor, said second resistor and said operating switch in turn, and a second transistor having a base connected to said one terminal of said power source via said operating switch, a collector connected to the emitter of the first transistor and an emitter connected to the other terminal of said power source;

said control circuit comprises a third transistor having a base connected to said one terminal of said power source via said shutter switch and a collector connected to said one terminal of said power source via said operating switch, a fourth transistor having a base connected to the collector of the first transistor via the capacitor, a collector connected to the emitter of the third transistor and an emitter connected to said other terminal of said power source, a fifth transistor having a base connected to the collector of the third transistor and an emitter connected to said other terminal of said power source, and a relay device including a solenoid coil having one terminal connected to the collector of the fifth transistor and the other terminal connected to said one terminal of said power source via said operating switch and a changeover switch connected across said motor circuit; and said selecting means comprises a switch and a diode connected in series with each other, one end of said series circuit being connected to the collector of the first transistor via the capacitor and the other end of said series circuit being connected to said other terminal of said power source.

9. A motor-drive controlling apparatus according to claim 2 including a power source having a pair of terminals, and wherein:

said motor is connected to one terminal of said power source via said shutter switch and said operating switch in turn;

said timer circuit comprises a capacitor, a first resistor, a second resistor, and a first transistor having a base connected to said one terminal of said power source via said shutter switch and said operating switch, a collector connected to said one terminal of said power source via said first resistor and also via said capacitor, said second resistor and said operating switch in turn;

said control circuit comprises a second transistor having a base connected to the collector of the first transistor via the capacitor and an emitter connected to the other terminal of said power source, a bistable circuit having a first trigger input terminal connected to said motor-driven switch to receive a trigger signal in response to the operation thereof and a second trigger input terminal connected to the collector of the second transistor, and a relay device connected to the bistable circuit to be operated in response to the output thereof and having a first relay switch connected across said motor circuit and a second relay switch having a movable contact connected to said one terminal of said power source via said operating switch, a normally closed contact connected to the second trigger input terminal of the bistable circuit and a normally open contact; and said selecting means comprises a switch connected between the normally open contact of the second relay switch and the base of the second transistor.

10. A motor-drive controlling apparatus used in attachment with a still camera having a shutter releasing mechanism and a film winding mechanism to permit alternatively a single frame photographing operation and a continuous photographing operation to be carried out with film charged therein, comprising:

a motor circuit including a drive motor operatively coupled to and selectively driving said shutter releasing mechanism and said film winding mechanism;

a shutter switch connected across said motor circuit and coupled to said shutter releasing mechanism so as to be actuated interlockingly with said shutter releasing mechanism;

a motor-driven switch connected across said motor circuit;

at least one operating switch coupled to said motor circuit for operating said motor-drive controlling apparatus;

a first timer circuit connected to said operating switch and to said shutter switch, said first timer circuit being operative in response to the operation of said operating switch in association with the operation of said shutter switch and to change its output condition after a predetermined length of time;

a second circuit coupled to said first timer circuit for setting a photographing interval between successive photographs in the continuous photographing operating mode, said second circuit being operative in response to an output of said first timer circuit;

a third timer circuit connected to said second timer circuit and to said shutter switch and being operative in response to the output of the second timer circuit in association with the operation of said shutter switch and to change its output condition after a predetermined period of time;

a control circuit connected to said third timer circuit and to said shutter switch and being operative in response to the output condition of said third timer circuit in association with the operation of said shutter switch for controlling the energization of said motor in association with the respective operations of said motor-driven switch and said shutter switch; and means for selecting said single frame photographing operation or said continuous photographing operation, said selecting means being connected to said third timer circuit and including means for changing the output condition of said third timer immediately after the operation of said shutter switch when said single frame photographing operation is selected.

11. A motor-drive controlling apparatus according to claim 10 wherein said second timer circuit includes an RC circuit means having a plurality of time constants, and means for selectively setting the time constant thereof.

12. A motor-drive controlling apparatus used in attachment with a still camera having a shutter releasing mechanism and a film winding mechanism to permit alternatively a single frame photographing operation and a continuous photographing operation to be carried out with film charged therein, comprising:

a motor circuit including a drive motor operatively coupled to and selectively driving said shutter releasing mechanism and said film winding mechanism;

a shutter switch connected across said motor circuit and including means for interlockingly coupling same to said shutter releasing mechanism so that said shutter switch is actuated simultaneously with said shutter releasing mechanism;

a motor-driven switch connected across said motor circuit;

at least one operating switch coupled to said motor circuit for operating the motor-drive controlling apparatus;

a first timer circuit connected to said operating switch and to said shutter switch, said first timer circuit including means responsive to the operation of said operating switch in association with the operation of said shutter switch to render said first timer circuit operative to change its output condition a predetermined length of time after it has been rendered operative;

a control circuit connected to said first timer circuit and to said shutter switch and being operative in response to the output condition of said first timer circuit in association with the operation of said shutter switch for controlling the energization of said motor in association with the respective operations of said motordriven switch and said shutter switch;

a second timer circuit the output of which is connected to said first timer circuit for setting selectively a photographing interval in the continuous photographing operating mode, said second timer circuit being connected to said control circuit and being operative in response to the operation of said control circuit to control the operation of said first timer circuit in response to the output of said second timer circuit; and means for selecting said single photographing operation or said continuous photographing operation, said selecting means being connected to said first timer circuit to form a circuit for changing the output condition thereof immediately after the operation of said shutter switch when said single frame photographing operation is selected.

\* \* \* \* \*

UNITED STATES PATENT AND TRADEMARK OFFICE
CERTIFICATE OF CORRECTION

PATENT NO. : 3,940,776
DATED : February 24, 1976
INVENTOR(S) : Isao KONDO

It is certified that error appears in the above-identified patent and that said Letters Patent are hereby corrected as shown below:

In the Abstract, line 9, after "The timer"
    change "switch" to --circuit--;

Column 15, line 40, after "a second" insert
    --timer--.

Signed and Sealed this eighth Day of June 1976

[SEAL]

Attest:

RUTH C. MASON
*Attesting Officer*

C. MARSHALL DANN
*Commissioner of Patents and Trademarks*